(12) United States Patent
Mani et al.

(10) Patent No.: US 11,599,815 B1
(45) Date of Patent: Mar. 7, 2023

(54) SCALABLE AND BOTTOM-UP APPROACH TO AUTOMATED ANOMALY DETECTION

(71) Applicant: Progress Software Corporation, Bedford, MA (US)

(72) Inventors: Ashutosh Mani, Summerville, SC (US); Shyamantak Gautam, Kasavanahalli (IN); Ruban Phukan, Foster City, CA (US); Santosh Kumar, Foster City, CA (US)

(73) Assignee: PROGRESS SOFTWARE CORPORATION, Burlington, MA (US)

(*) Notice: Subject to any disclaimer, the term of this patent is extended or adjusted under 35 U.S.C. 154(b) by 642 days.

(21) Appl. No.: 16/690,436

(22) Filed: Nov. 21, 2019

Related U.S. Application Data

(60) Provisional application No. 62/770,672, filed on Nov. 21, 2018.

(51) Int. Cl.
  *G06F 21/00* (2013.01)
  *G06N 7/00* (2023.01)
  *G06N 20/00* (2019.01)

(52) U.S. Cl.
  CPC ............. *G06N 7/005* (2013.01); *G06N 20/00* (2019.01)

(58) Field of Classification Search
  CPC .............................. G06N 7/005; G06N 20/00
  See application file for complete search history.

(56) References Cited

U.S. PATENT DOCUMENTS

| | | | | |
|---|---|---|---|---|
| 2016/0041948 A1* | 2/2016 | Vichare | ................... | G06N 5/04 702/181 |
| 2017/0147941 A1* | 5/2017 | Bauer | .................... | G06N 20/10 |
| 2018/0115578 A1* | 4/2018 | Subbarayan | ............ | H04L 63/04 |
| 2019/0287005 A1* | 9/2019 | Subramaniyan | ........ | G06F 30/20 |
| 2020/0065212 A1* | 2/2020 | Chanda | ............... | G06F 11/3452 |

* cited by examiner

*Primary Examiner* — Mahfuzur Rahman
(74) *Attorney, Agent, or Firm* — Patent Law Works LLP

(57) ABSTRACT

A system and method are disclosed for bottom-up modeling and prediction of asset anomalies. In one embodiment, the system receives first sensor data from a first sensor, the first sensor associated with a first asset; smooths the first sensor data; determines a first stage within sensor data, the sensor data including the first sensor data; determines a first set of anomalies within the first stage; generates a first asset state space associated with the first asset; trains a base model describing a first group of one or more assets, the first group of one or more assets including the first asset; and trains, using the base model, a final model particular to the first asset.

18 Claims, 12 Drawing Sheets

Example Concatenation for Transitioning from Sensor-Level Information to Asset State Space

<sensor1_Group1a_Stage1a_Anomalous_sensor2_Group1a_Stage1a_No_sensor3_Group1b_Stage1b_No>
<sensor1_Group1a_Stage1a_Anomalous_sensor2_Group1a_Stage1a_Anomalous_sensor3_Group1b_Stage1b_No>
<sensor1_Group1a_Stage2a_No_sensor2_Group1a_Stage2a_No_sensor3_Group1b_Stage1b_No>

• • •

<sensor1_Group1a_Stage1a_No_sensor2_Group1a_Stage2a_No_sensor3_Group1b_Stage2b_No>
<sensor1_Group1a_Stage1a_No_sensor2_Group1a_Stage1_No_sensor3_Group1b_Stage1b_Anomalous>

Figure 8

SCALABLE AND BOTTOM-UP APPROACH TO AUTOMATED ANOMALY DETECTION

CROSS-REFERENCE TO RELATED APPLICATIONS

This claims priority to and the benefit of U.S. Provisional Patent Application Ser. No. 62/770,672, filed Nov. 21, 2018, titled "Scalable and Bottoms-Up Approach to Automated Anomaly Detection," which is incorporated herein by reference in its entirety.

FIELD OF INVENTION

The present disclosure relates to machine learning and artificial intelligence. More specifically, the present disclosure relates to determining anomalous behavior using a bottom-up approach.

BACKGROUND

By 2020, there will be over 30 billion connected devices and the total volume of data generated by IoT will reach 600 ZB per year. However, only 26% of companies have reported that their IoT initiatives have been successful. Drawing insights from Big Data is complex and is mostly done manually today. The majority of companies claim that the lack of data science skills is their most significant hurdle. Because of this shortage, companies that are starting to get into IoT do not have a sufficient data science team. Furthermore, developing a data science team is also a large-scale investment that will not necessarily generate profitable results. Even with a large data science team, because of the complexity of analyzing the data and the number of components involved, the time needed to generate outcomes is significant. Additionally, 80% of the problems that companies are dealing with today are new and unknown which means the complexity is through the roof. However, there are few that fully understand the complexity of building their own models and algorithms. As a result of this, there is a need for AWL tools that enable data science professionals to become more efficient.

Additionally top-down modeling, where an asset is not modeled using its sub-components, and clustering techniques are not scalable and do not model the inner dynamics of the asset, and are not able to account for the fact that there could be a number of different types of anomalies in the subcomponents of an asset.

SUMMARY

In general, an innovative aspect of the subject matter described in this disclosure may be embodied in methods that include receiving, using one or more processors, first sensor data from a first sensor, the first sensor associated with a first asset; smoothing, using the one or more processors, the first sensor data; determining, using the one or more processors, a first stage within sensor data, the sensor data including the first sensor data; determining, using the one or more processors, a first set of anomalies within the first stage; generating, using the one or more processors, a first asset state space associated with the first asset; training, using the one or more processors, a base model describing a first group of one or more assets, the first group of one or more assets including the first asset; and training, using the one or more processors and the base model, a final model particular to the first asset.

In general, another innovative aspect of the subject matter described in this disclosure may be embodied in systems that receives first sensor data from a first sensor, the first sensor associated with a first asset; smooths the first sensor data; determines a first stage within sensor data, the sensor data including the first sensor data; determines a first set of anomalies within the first stage; generates a first asset state space associated with the first asset; trains a base model describing a first group of one or more assets, the first group of one or more assets including the first asset; and trains, using the base model, a final model particular to the first asset.

According to yet other innovative aspects of the subject matter described in this disclosure, one or more systems comprising a processor; and a memory storing instructions that, when executed, cause the system to perform one of the methods described above.

Other implementations of one or more of these aspects include corresponding systems, apparatus, and computer programs, configured to perform the actions of the methods, encoded on computer storage devices. These and other implementations may each optionally include one or more of the following features.

Determining the first stage within the first sensor data comprises: determining a first set of change points within the first sensor data; dividing, based on the first set of change points, the first sensor data into the first stage of the first sensor data and a second stage of the first sensor data; determining a first probability density distribution of the first stage of the first sensor data; determining a second probability density distribution of the second stage of the first sensor data; determining that the first probability density distribution and the second probability density distribution are statistically similar; and responsive to determining that the first probability density distribution and the second probability density distribution are statistically similar, merging the second stage of the first sensor data into the first stage of the first sensor data.

Receiving second sensor data from a second sensor; smoothing the second sensor data; calculating a correlation and a covariance between the first sensor and the second sensor based on the smoothed first sensor data and smoothed second sensor data; and grouping the first sensor and the second sensor into a first sensor group based on the correlation and the covariance, wherein the sensor data is sensor data associated with the first sensor group, the first sensor group including the first sensor and the second sensor. The determining of the first set of anomalies within the within the first stage of the sensor data uses one or more of a magnitude-based algorithm, a sequence-based algorithm, and a frequency-based algorithm.

Determining a first set of rare asset states in the first asset state space; determining a second set of rare asset states in a second asset state space, the second asset state space associated with a second asset; determining a correlation and a covariance between the first asset and the second asset; and, based on the correlation and covariance, grouping the first asset and the second asset into the first group of one or more assets.

The base model describing the first group of one or more assets includes one or more of: a first base model created for anomalies identified at the asset level; a second base model created from event data received from a user, when the event data has been received from the user; and a model created for a system-identified, known event. The final model is an ensemble.

Receiving new sensor data from the first sensor; applying the final model to the new sensor data; and presenting a probabilistic prediction of an anomaly to a user based on the application of the final model to the new sensor data.

Analyzing the first sensor data, which is discrete data, for repeating patterns in sensor data leading up to an anomaly. The analysis may include one or more of a prefix scan, association rule making, and distribution-based pattern detection.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIG. 8 illustrates an example of information concatenated to transition from sensor-level to an asset state space according to one embodiment.

DETAILED DESCRIPTION

Figure 1:
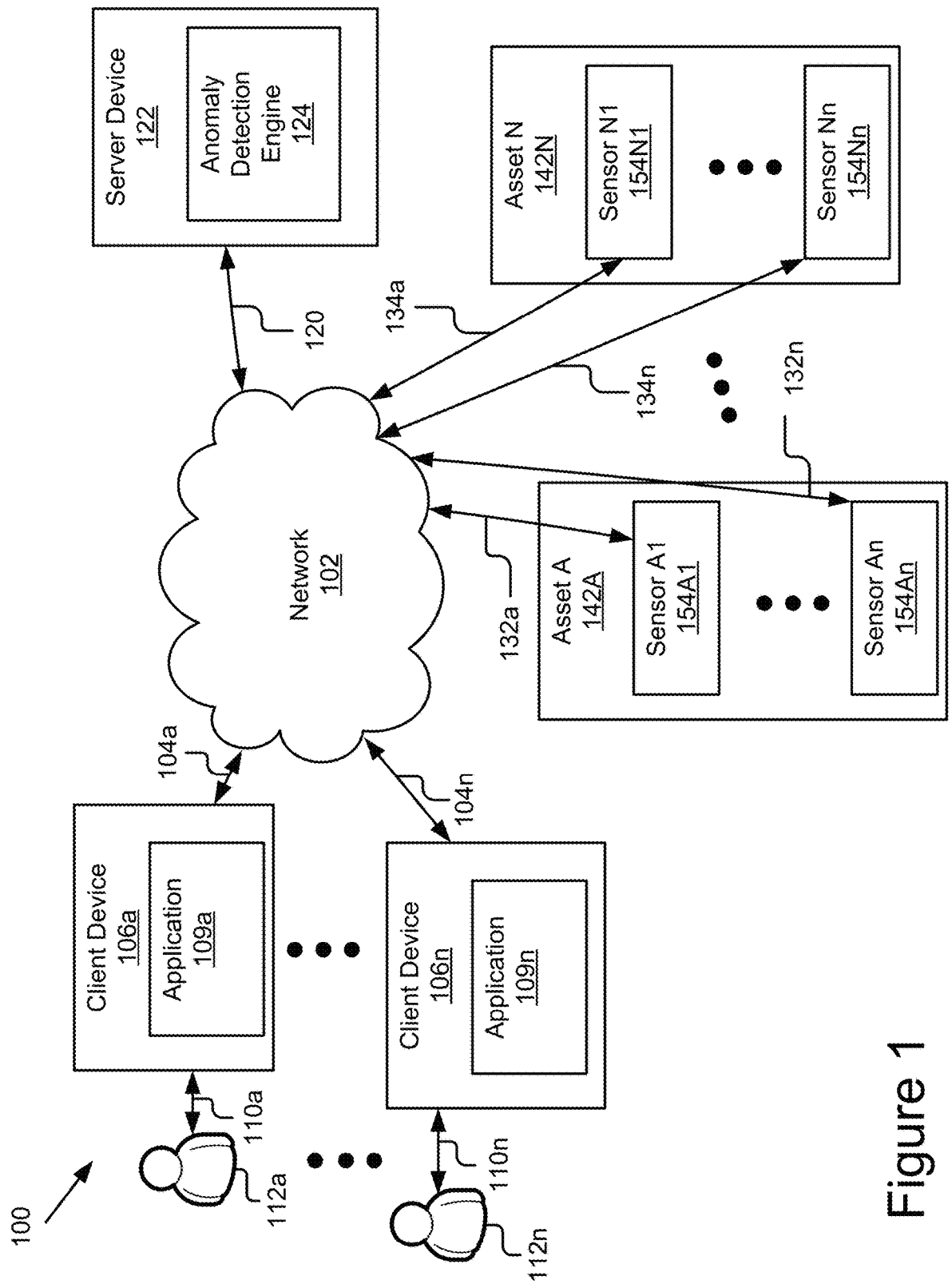
FIG. 1 is a block diagram illustrating an example system for anomaly detection according to one embodiment.

FIG. 1 is a block diagram illustrating an example system 100 for anomaly detection according to one embodiment. The illustrated system 100 includes Assets 142A . . . 142N1 (also referred to individually and collectively as asset 142). The use of the nomenclature "a" and "n" in the reference numbers indicates that any number of those elements having that nomenclature may be included in the system 100. Therefore, it should be notes that, while two assets, Asset A 142A and Asset N 142N, are illustrated in the example embodiment, the system may include any number of assets, which may, depending on the embodiment, be of a same type (e.g. different instances of the same machine), similar type (e.g. different brands or models of machine that perform similar or the same functions), different type (e.g. different machines that perform different functions in an industrial process), or combination thereof. It should be recognized that, while the preceding examples refer to machines (e.g. a car, a plane, power plant, turbine, generator, an engine, etc.), a machine is merely one example of an asset and other examples exist and are within the scope of this disclosure. For example, an asset may be a communication network or a component thereof (e.g. a server, a router, etc.), a person (e.g. a customer service agent, sales representative, employee, etc.), a factory or component thereof (e.g. a conveyor belt, a mold, a die, press, etc.).

Asset 142A is (or subcomponents thereof are) associated with sensor A1 154A1 and sensor An 154An in the illustrated embodiment, and Asset 142N is (or subcomponents thereof are) associated with sensor N1 154N1 and sensor Nn 154Nn in the illustrated embodiment. However, it should be noted that, depending on the embodiment, an asset 142 may be associated with any number of sensors 154 and that the number of sensors may vary from asset to asset.

The illustrated system 100 further includes client devices 106a . . . 106n, a server device 122, and sensors 154A1 . . . 154An and 151N1 . . . 154Nn, which are communicatively coupled via a network 102 for interaction with one another. For example, the client devices 106a . . . 106n (also referred to individually and collectively as client devices 106) may be respectively coupled to the network 102 via signal lines 104a . . . 104n and may be accessed by users 112a . . . 112n (also referred to individually and collectively as user 112) as illustrated by lines 110a . . . 110n. The server device 122 may be coupled to the network 102 via signal line 120. The sensors 154A1 . . . 154An and 154N1 . . . 154Nn may also be coupled to the network 102 as illustrated by signal lines 132a, 132n, 134a and 134n. For example, the server device 122 may be coupled via the network 102 to receive data and events from the sensors 154.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Comma Separated Values (CSV), etc. In addition, all or some of links can be encrypted using encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a . . . 106n may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106a . . . 106n may be the same or different types of computing devices.

In the depicted implementation, the client devices 106a . . . 106n respectively contain instances 109a . . . 109n of an application 109 (also referred to individually and collectively as application 109). The application 109 may be storable in a memory and executable by a processor of a client device 106. For clarity and convenience, unless otherwise indicated, application 109 refers to an application through which a user 112 interacts with the anomaly detection engine 124. The applications 109a and 109n are not necessarily the same application or application type. For example, the application 109n used by the user (e.g. user 112n) may be a web-browser, and the application 109a used by another user (e.g. 112a) may be dedicated application installed on the client device 106a.

The server device 122 may include one or more computing devices having data processing, storing, and communication capabilities. For example, the server device 122 may include one or more hardware servers, server arrays, storage devices, systems, etc., and/or may be centralized or distributed/cloud-based. In some implementations, the server device 122 may include one or more virtual servers, which operate in a host server environment and access the physical hardware of the host server including, for example, a processor, memory, storage, network interfaces, etc., via an abstraction layer (e.g., a virtual machine manager). In one embodiment, the server device 122 includes the anomaly detection engine 124.

A sensor 154 may be a device that detects or measures a property of an asset or component thereof. The number and types of sensors may vary based on the asset, embodiment, and the property being measured (e.g. temperature, duty cycles, time, latency, watt hours, bandwidth, frequency, revolutions per minute, mass, weight, stress, strain, deflection, distance, torque, altitude, barometric pressure, lumens, radiation, position, etc.). Examples of sensors may include, but are not limited to, thermometer, barometer, timer, strain meter/gauge, tachometer, stress meter/gauge, scale, etc.

It should be understood that the system 100 illustrated in FIG. 1 is representative of an example system 100 for anomaly detection according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 100 may be integrated into to a single computing device or system or additional computing devices, systems, etc. For example, the anomaly detection engine 124 may be spread among multiple sets of server devices 122 (not shown).

Figure 2:
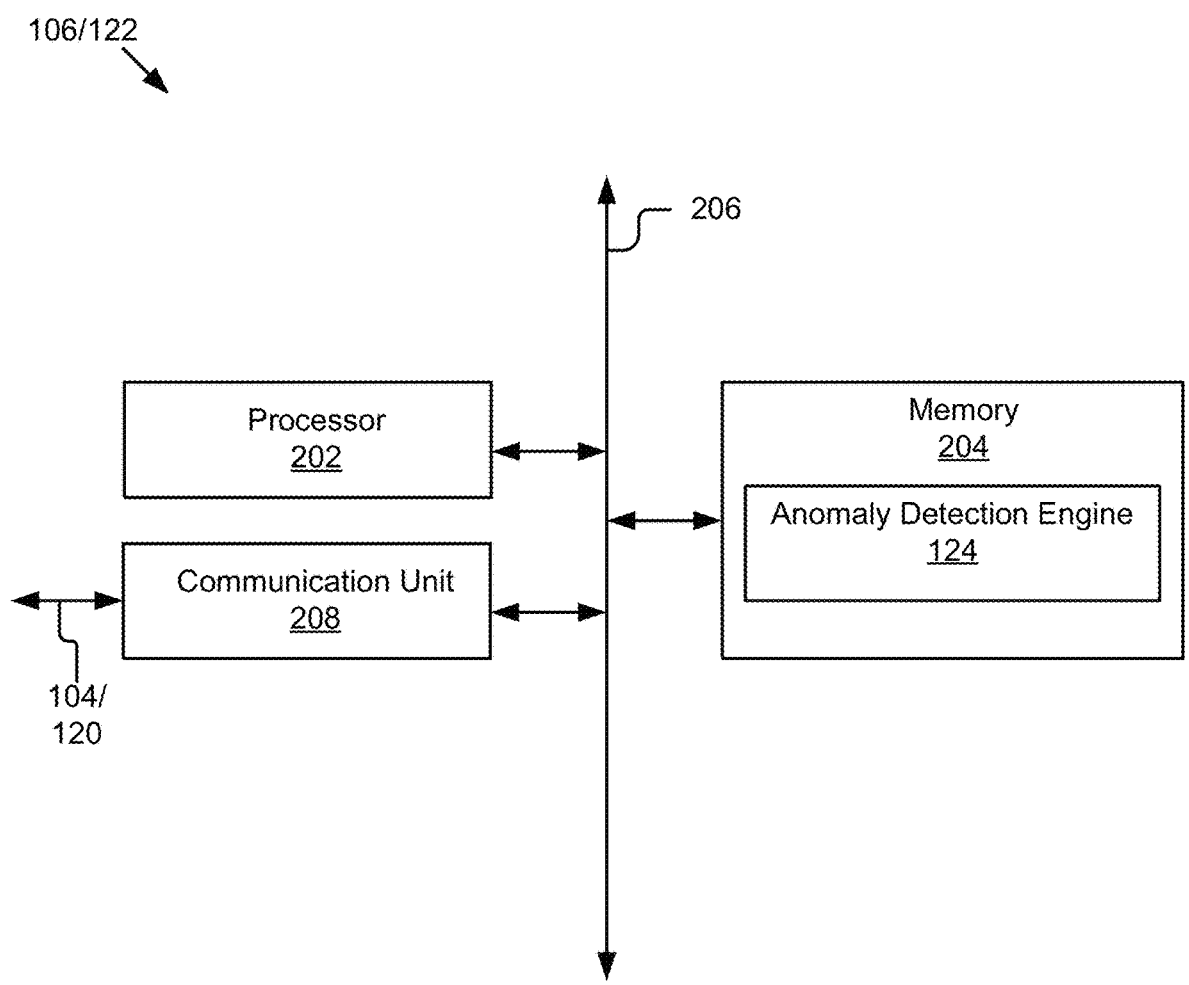
FIG. 2 is a block diagram illustrating an example computing device according to one embodiment.

FIG. 2 is a block diagram of an example computing device 106/122 according to one embodiment. The computing device 106/122, as illustrated, may include a processor 202, a memory 204 and a communication unit 208, which may be communicatively coupled by a communications bus 206. The computing device 106/122 depicted in FIG. 2 is provided by way of example and it should be understood that it may take other forms and include additional or fewer components without departing from the scope of the present disclosure. For example, while not shown, the computing device 106/122 may include a storage device, input and output devices (e.g., a display, a keyboard, a mouse, touch screen, speakers, etc.), various operating systems, sensors, additional processors, and other physical configurations. Additionally, it should be understood that the computer architecture depicted in FIG. 2 and described herein may be applied to multiple entities in a system 100, for example, the computing device 106/122 may be a client device 106 or a server device 122.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing device 106/122 including, for example, the memory 204 and communication unit 208.

The memory 204 may store and provide access to data to the other components of the computing device 106/122. In some implementations, the memory 204 may store instructions and/or data that may be executed by the processor 202. For example, in the illustrated embodiment, the memory 204 may store the anomaly detection engine 124. The memory 204 is also capable of storing other instructions and data, including, for example, an operating system, hardware drivers, other software applications, databases, conversation histories, user preferences, etc. The memory 204 may be coupled to the bus 206 for communication with the processor 202 and the other components of the computing device 106/122.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory 204 may be a single device or may include multiple types of devices and configurations.

The bus 206 can include a communication bus for transferring data between components of a computing device 106/122 and/or between computing devices (e.g. between one or more of the client devices 106, and server device 122), a network bus system including the network 102 or portions thereof, a processor mesh, a combination thereof, etc. In some implementations, the anomaly detection engine 124, its sub-components 302, 304, 306, 308, 310, and various other software operating on the computing device 106/122 (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102 or directly with one or more sensors 154. For instance, the communication unit 208 may include, but is not limited to, CAT-type interfaces; wireless transceivers for sending and receiving signals using radio transceivers (4G, 3G, 2G, etc.) for communication with the network 102, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols.

As mentioned above, the computing device 106/122 may include other and/or fewer components. Examples of other components may include a display, an input device, a sensor, etc. (not shown). In one embodiment, the computing device 106/122 includes a display (not shown). The display may display electronic images and data for presentation to a user 112. The display may include any display device, monitor or screen, including, for example, an organic light-emitting diode (OLED) display, a liquid crystal display (LCD), etc. In some implementations, the display may be a touch-screen display capable of receiving input from a stylus, one or more fingers of a user 112, etc. For example, the display may be a capacitive touch-screen display capable of detecting and interpreting multiple points of contact with the display surface.

The input device (not shown) may include any device for inputting information into the computing device 106/122. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user 112. For example, the user 112 could interact with an emulated (i.e., virtual or soft) keyboard displayed on the touch-screen display by using fingers to contacting the display in the keyboard regions.

Example Anomaly Detection Engine 124

Figure 3:
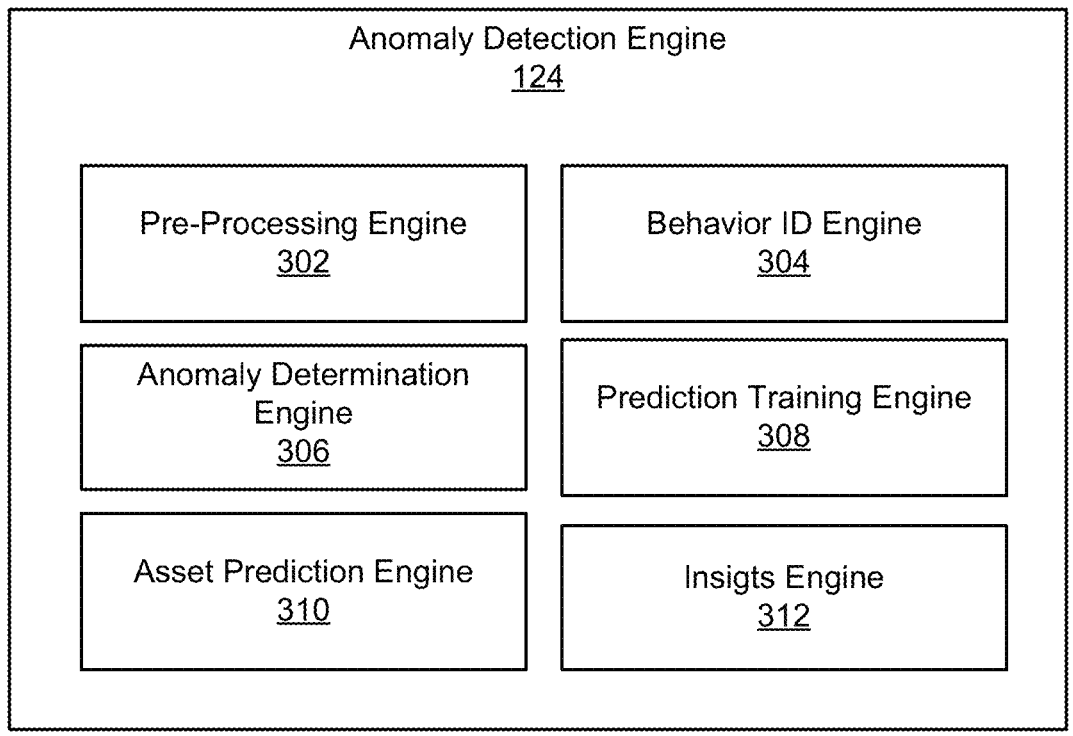
FIG. 3 is a block diagram illustrating an example anomaly detection engine according to one embodiment.

Referring now to FIG. 3, an example of the anomaly detection engine 124 is shown in more detail according to one embodiment. FIG. 3 is a block diagram of the anomaly detection engine 124 included in the server device 122 according to one embodiment, which is illustrated in FIG. 1. In one embodiment, an engine (e.g., 124) is a set of instructions executable by the processor 202. In another embodiment, an engine is stored in the memory 204 and is accessible and executable by the processor 202. In either embodiment, an engine is adapted for cooperation and communication with the processor 202, other components of the computing device 106/122 (e.g. other engines).

In one embodiment, the anomaly detection engine 124 comprises a pre-processing engine 302, a behavior ID engine 304, an anomaly determination engine 306, a prediction training engine 308, an asset prediction engine 310, and an insights engine 312. As mentioned previously, depending on the embodiment, the engines 302, 304, 306, 308, 310, 312 comprised in the anomaly detection engine 124 are not necessarily all on the same computing device 106/122. In one embodiment, the engines 302, 304, 306, 308, 310, 312 and/or their functionality are distributed across multiple computing devices 106/122. For example, in one embodiment, the engines 302, 304, 306, 308, 310, 312 are distributed across multiple server devices 122.

It should be recognized that the calculations of this written description maybe be done in parallel, incrementally in an online fashion to ensure new data gets ingested continuously and the calculations can continue, or by a combination thereof, depending on the embodiment.

When data is first imported, it is naive to assume that the data is ready for analysis. This is because human and machine (e.g. sensor) errors may have been introduced. As a result, the data is checked and any discrepancies should be fixed before analyzing the data. This preprocessing is normally a very time-consuming job in data analytics. For example, using existing approaches it may take data scientists 3-6 month to pre-process GBs of data. The pre-processing engine 302 of the anomaly detection engine 124 automates the pre-processing, which is otherwise a long, cumbersome, and error prone task, and generates a clean dataset within minutes.

The pre-processing engine 302 includes code and routines for receiving and pre-processing sensor or event data. Depending on one or more of the embodiment and the characteristics of the data (e.g. that of the sensor and/or event data) received by the pre-processing engine 302, the pre-processing performed by the pre-processing engine 302 may include one or more of null value handling, missing data handling, data scaling, smoothing, conversion of timestamps or dates, separation of data sets, data batching, and assignment of sensor groups.

In some embodiments, the pre-processing engine 302 receives data with missing values or null values. It is not uncommon for data sets to have missing or null values. Such missing or null values may be present in the data for a number of reasons including a problem with the sensor generating the data or a manipulation error that occurred while handling the data.

The pre-processing engine 302 provides null values/missing data handling so that the null/missing values do not introduce incorrect asset states in later steps of the anomaly detection process and misrepresent the system in which anomalies are to be detected.

In one embodiment, the pre-processing engine 302 handles non-consecutive missing or null values are handled by applying a method of imputation. Through imputation, the pre-processing engine 302 determines a pattern that the data follows up to the point of the null/missing value and the pattern the data follows after that point. Then, using those two patterns, the pre-processing engine 302 predicts what that null/missing value would have been at the moment in time associated with the null/missing value. Examples of imputation include, but are not limited to, applying a regression model, calculating the mean of one or more surrounding values.

Figure 4:
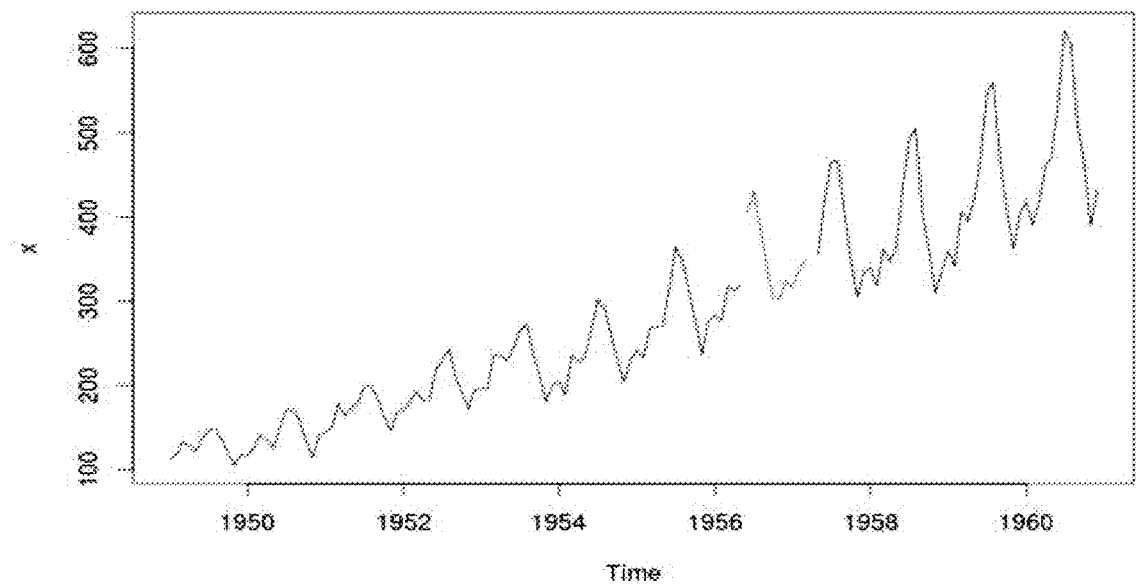
FIG. 4 illustrates an example of sensor data missing non-consecutive data values according to one embodiment.
Figure 5:
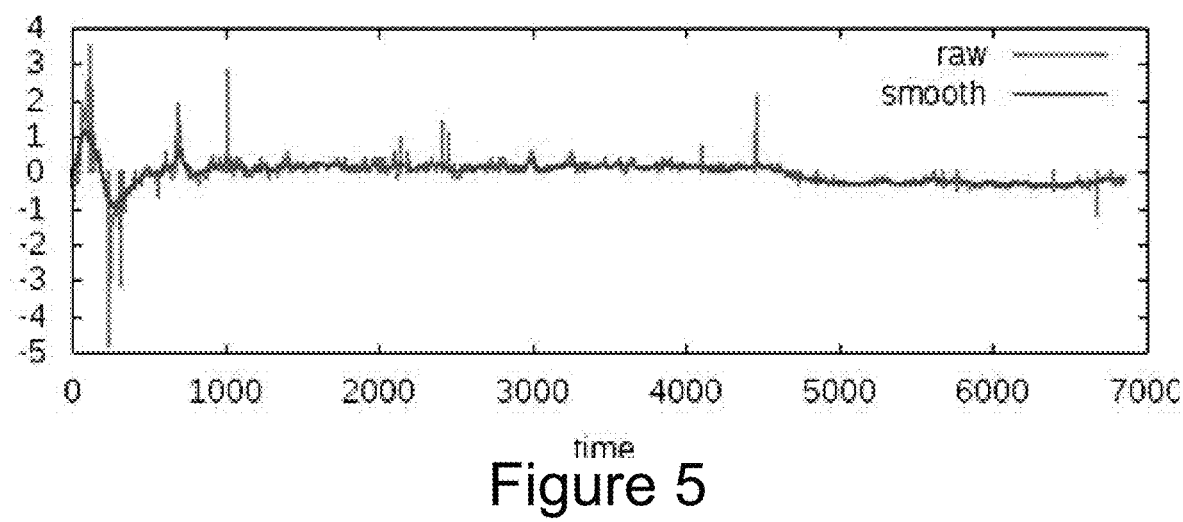
FIG. 5 illustrates an example of raw and smoothed sensor data according to one embodiment.

Referring now to FIG. 4, an example of sensor data with missing values is illustrated. In the illustrated example, the data has a series of peaks and values with a general trend up and to the right. However, there are two non-consecutive, missing data points in the illustrated sensor data, and the pre-processing engine 302 predicts what those missing values are expected to be.

In one embodiment, the pre-processing engine 302 handles consecutive missing or null values by filling those values with 0. The consecutive "0" values may be used to separate the data into stages in during subsequent stage detection, which is described below. In one embodiment, when data is noisy and has a mix of missing, null, and NA values, the pre-processing engine 302 prompts the user for input (e.g. through generating and receiving user interactions via a user interface) to determine the appropriate approach.

In some embodiments, the pre-processing engine 302 scales received sensor data. In one embodiment, the pre-processing engine 302 scales the data by normalizing the data. For example, the pre-processing engine 302 scales the value by subtracting the mean value (e.g. average temperature) form each sensor datum (e.g. a individual temperature reading) and dividing that result by the standard deviation (e.g. the standard deviation of the temperature).

In one embodiment, the pre-processing engine 302 scales the sensor data by converting the sensor data into a set of common units. For example, the pre-processing engine 302 scales the data into a common measurement system (e.g. converting all sensor data into the metric or imperial system). In another example, the pre-processing engine 302 scales the units (e.g. converting seconds to milliseconds, kilograms to grams, centimeters to millimeters, etc.). In one embodiment, the pre-processing engine 302 scales the sensor data based on what the sensor measures into a common unit. For example, the pre-processing engine 302 converts any torque measurements into inch pounds.

In one embodiment, the pre-processing engine 302 scales the data by removing outliers to generate truncated sensor data, generates the mean and standard deviation from the truncated sensor data, and use the mean and standard deviation to scale the remaining data. For example, the pre-processing engine 302 removes outliers from the sensor data and scales the data by calculating, for each value (Y) in the truncated sensor data, $(y-y_{min})/(y_{max}-y_{min})$, where $y_{max}$ and $y_{min}$ are the maximum and minimum, respectively, sensor values within the truncated data.

In some embodiments, the pre-processing engine 302 smooths received sensor data. While the various measurements are being recorded by the sensor, there could be certain instances where there was a spike in the measurement in either the positive or negative direction. Such spikes may occur for a number of reasons. On potential reason is due to the faultiness of the sensor at that moment in time.

As described below with reference to the behavior ID engine 304, stage detection utilizes probability density distributions. Smoothing the data removes noise that was picked up while the data was being recorded or processed and reduces the effect of spikes. The reduction in spikes smooths the data which helps in detecting change points. The change points mark the beginning and end of a potential stage. Consecutive potential stages are merged into one if they belong to the same probability density distribution, as discussed below with reference to the behavior ID engine 304.

In one embodiment, the pre-processing engine 302 using median filters to smooth received sensor data. Median filters look at a defined window of neighbors around a specific value (e.g. a window of 3, 4, 5, etc. values). Based on the median of the specific value and its neighbors, the original value is replaced with the median value.

In some embodiments, the pre-processing engine 302 converts a date time to a timestamp so that datetimes are interpreted uniformly, as different types or formats would otherwise become problematic when analyzing data linearly/chronologically. For example, the pre-processing engine 302 convert the datetimes to Unix EPOCH time according to one embodiment. The Unix EPOCH time is the number of seconds that have elapsed since Jan. 1, 1970 (midnight UTC/GMT). Therefore, there is no discrepancy in the EPOCH time if the datetime is in a different time zone than UTC/GMT.

In some embodiments, the pre-processing engine 302 separates the received data set into separate data sets. In one embodiment, the pre-processing engine 302 separates the received data into categorical sensor data (e.g. day of week, High/Medium/Low, True/False, etc.), continuous sensor data (e.g. measurement of temperature, rpms, torques, stress, strain, pressure, bandwidth, latency, etc.), and event data (e.g. maintenance log, heuristic/rule based events, offline, etc.). In one embodiment, this separation is so that subsequent components and processes receive the appropriate data type as input. In one embodiment, there are two types of datasets that can be read as an input into the platform.

In some embodiments, the pre-processing engine 302 batches data based on one or more of the granularity of the data (i.e. how often an observation is recorded), the amount of sensor data (i.e. the number of observations), and the infrastructure of the system 100 (e.g. the processing capabilities of the server device 122. For example, if a measurement is taken at a highly granular level (e.g. millisecond) the sensor data set could have a 1 million or more observations. In such a scenario, the pre-processing engine 302 generates batches of data for processing (e.g. 10000 observations per batch) rather than processing one million observations all at once.

In some cases, an asset may be associated with multiple sensors, and those sensors' measurements may be interrelated. For example, the measurement taken by sensor A is an independent variable (e.g. torque) and sensor B measures a dependent variable (e.g. horse power at what torque), and are therefore interrelated by dependency. In another example, sensors' measurements may be functionally interrelated. For example, the revolution per minute (rpm) of a front-right tire may be interrelated with the rpms of the back-right tire. It may be beneficial assign similar sensors to group such sensors in order to determine the correct algorithm(s) to apply, rather than processing all sensors individually and simultaneously.

Accordingly, in some embodiments, the pre-processing engine 302 groups multiple sensors. In one embodiment, the pre-processing engine 302 determines the groups by calculating different distance measures between the candidate sensors and minimizing it. For example, the pre-processing engine 302 calculates the correlation and covariance between all combinations of candidate sensors (such as sensors 1 & 2, 1 & 3, 1 & 4, 2 & 3 and so on), and determines that those sensors which have a strong correlation and covariance with each other (e.g. satisfies a predetermined threshold) are grouped together. For example, if there are 5 sensors for one asset, group 1 could be sensors 1, 2, and 3 and group 2 could be sensors 4 and 5. In one embodiment, the pre-processing engine 302 uses a Pearson or Spearman Coefficient for continuous sensor data, and a phi or chi-squared coefficient for categorical sensor data.

Figures 6A, 6B:
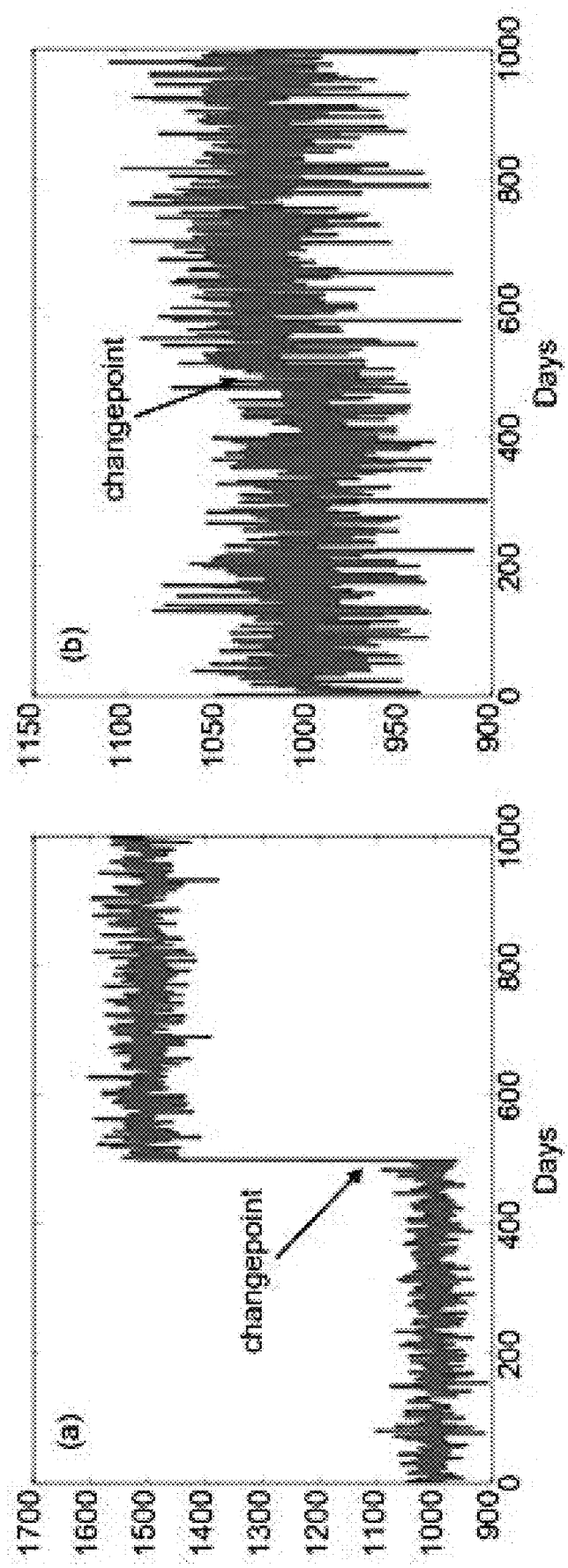
FIGS. 6a-b are charts illustrating example sensor data and change points therein according to one embodiment.

The behavior ID engine 304 includes code and routines for identifying behavior recorded by the sensor data. In one embodiment, the behavior ID engine 304 identifies data points that are likely sampled from the same, or similar, probability density distribution and maps those data points to a distinct stage of the sensor. For example, the behavior ID engine 304 applies change point detection to identify change points throughout the sensors data, which may be mapped to distinct stages of the sensor. A change point in a time series is a point that marks the beginning of a departure in the behavior of the time series, for example, a sudden peak. Referring to FIGS. 6a and 6b, sensor data is plotted and change points therein are labeled. In one embodiment, the behavior ID engine 304 uses one or more of a plurality of change point detection methods with an underlying scheme of monitoring recent past behavior of the time series with respect to distribution and slope, and, when the following point does not conform to the running bounds of the distribution, it is marked as a potential new change point. Or, to phrase differently, the changepoint is detected, by the behavior ID engine 304, monitoring a relative change in slope in a sliding window, accounting for variation in slope values throughout the time series. The behavior ID engine 304 then uses those change points to define stages for each sensor.

After separating each sensor's data into stages, the behavior ID engine 304 compares the stages (for each sensor) to determine whether the stages are recurring throughout the data. For example, when stages 1 and 2 are statistically similar to each other (e.g. based on their probability density distributions), then stages 1 and 2 are merge into a single stage. In one embodiment, the degree of statistical similarity that must be satisfied for the behavior ID engine 304 to merge stages is a qualified by the data. For example, when data has little noise, the similarity may be mean±1.5 standard deviations, while data that is noisy may have a range of mean±3 standard deviations. Merging reduces the risk of an introduction of error as a result of the change point detection calculations. For example, referring to FIG. 6b, while a change point is identified, upon visual inspection, it is not as readily apparent, particularly when compared to FIG. 6a, that there are two stages in the sensor data. In one embodiment, the behavior ID engine 304 determines that the first stage (i.e. the portion left of the change point in FIG. 6b) has a sufficiently similar probability density distribution to the second stage (i.e. the portion right of the change point in FIG. 6b) and merges those portions into a single stage.

Figure 7:
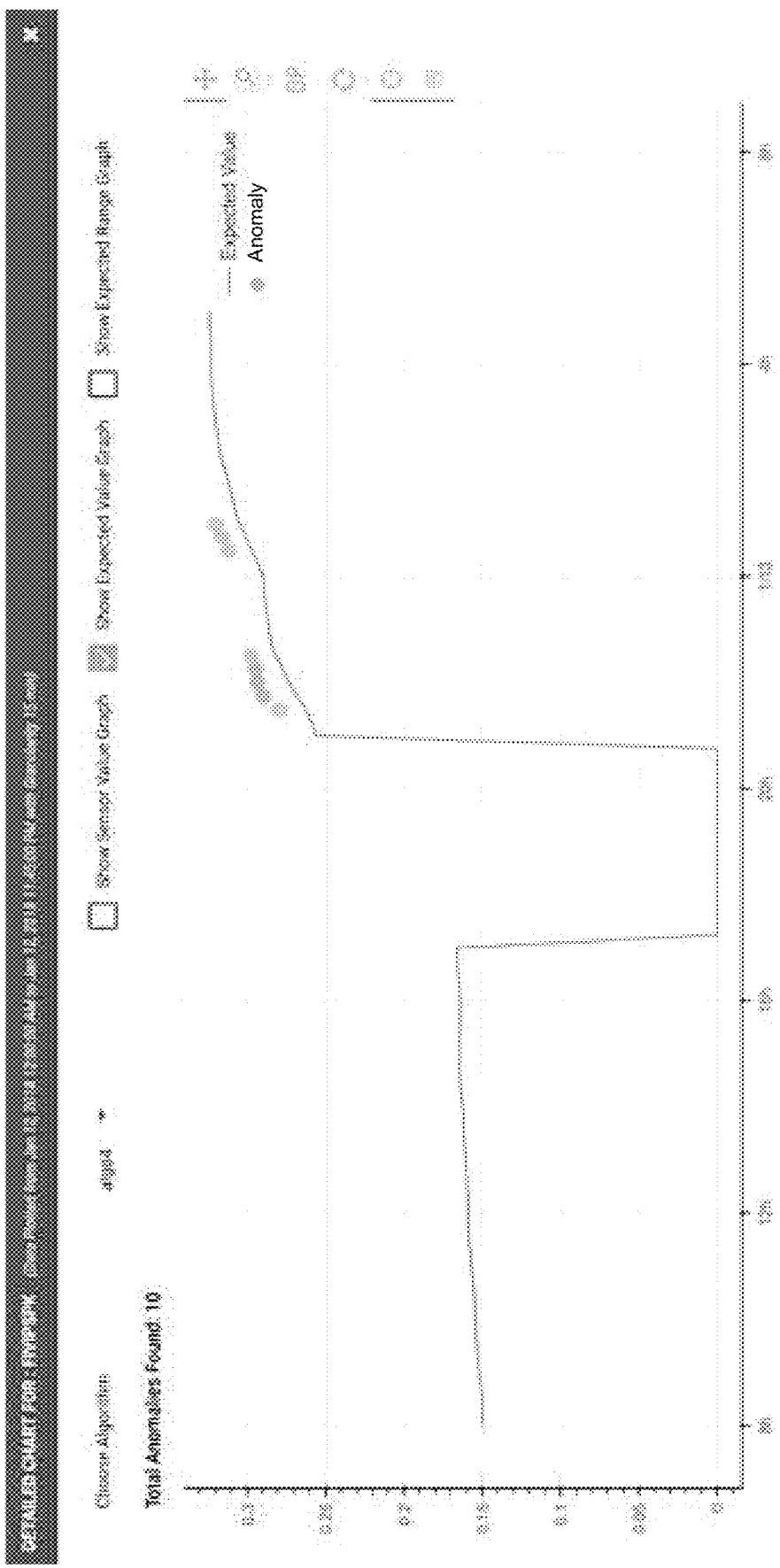
FIG. 7 is an illustration of an expected value graph including identified anomalies according to one embodiment.

The anomaly determination engine 306 includes code and routines for determining an existence of anomalies within the sensor stages. The division of each sensor's data into the stages and anomaly detection within those stages beneficially improves the accuracy of anomaly detection, and the predictions, discussed below. In one embodiment, the anomaly determination engine 306 determines an existence of anomalies within the sensor stages by determining expected values for the sensor data, comparing the expected values to the values actually sensed by the sensor, determining whether the difference satisfies a threshold, and identifying any points where the threshold is satisfied. For example, referring now to FIG. 7, the anomaly determination engine 306 has determined the expected value, which is depicted as the line, and identified ten (10) points, marked with circles in the illustrated example, where the measurement from the sensor data deviates from the expected data sufficiently to satisfy a threshold.

Depending on the signature of the sensor data, the anomaly determination engine 306 applies a different set of anomaly detection algorithms. In one embodiment, the anomaly determination engine 306 employs auto-tuning to find an optimum or near-optimum set of parameters for each of the algorithms mentioned below so even with a no-touch (by a user 112) run, the system 100 provides actionable results. Examples of anomaly detection algorithms include, but are not limited to magnitude-based, sequence-based, and frequency-domain-based algorithms.

In one embodiment, the anomaly determination engine 306 applies a magnitude-based algorithm based on recent historic context, such as filtering-based methods (e.g. exponential smoothing of the raw, continuous sensor data or exponential smoothing of the first order differential of continuous sensor data). In one embodiment, the anomaly determination engine 306 applies a magnitude-based algorithm based on local context, such as filtering-based methods applied to sliding window (e.g. median filter or mean filter applied to a sliding window, when the sensor data is continuous).

In one embodiment, the anomaly determination engine 306 applies a sequence-based algorithm, for example, based on transition probabilities of discretized signal from $2^{nd}$ order Markov process (e.g. estimated by first calculating transition matrix and applying an anomaly detection on top of the transition matrix). In one embodiment, the anomaly determination engine 306 applies a sequence-based algorithm, for example, based on transition probabilities of discretized signal learned from a probabilistic model (e.g. training a model to learn transition probabilities of different subsequences and identify anomalous subsequences by monitoring these probabilities). In one embodiment, the anomaly determination engine 306 applies SAX based sequence anomaly detection to categorical sensor data.

In one embodiment, the anomaly determination engine 306 applies a frequency-domain-based algorithm, for example, based on global context using S transform (e.g. getting time and frequency domain information from time series sensor data and identifying anomalies as points that are outliers across different frequencies at a given time slice).

While defining the stages for each sensor and determining anomalies at the sensor-level provides insight regarding the behavior of the asset through each sensor, the anomaly determination engine 306 develops an understanding of the behavior of the asset as a whole by aggregating the behavior of all sensors simultaneously to generate an asset state space, which includes information from the sub-components, via the sensor sensors, embedded in it.

The anomaly determination engine 306 includes code and routines for generating an asset state space in which information from sub-components of the asset are embedded. In some embodiments, the anomaly determination engine 306 aggregates the behavior of all sensors. For example, in one embodiment, the anomaly determination engine 306 concatenates information to generate the asset state space. In one embodiment, the anomaly determination engine 306 concatenates a sensor name, sensor stage, sensor group, and whether anomalous behavior was detected in the sensor's data. For example, referring to FIG. 8, assume that an asset has three (3) sensors named sensor1," sensor2" and "sensor3" and that two (2) of the sensors (i.e. "sensor1" and "sensor2") are determined by the pre-processing engine 302 to belong to a common group (i.e. "Group 1a"). In such an example embodiment, the sensor name, sensor stage, sensor group, and whether anomalous behavior was detected in the sensor's data could take the form of the strings illustrated (i.e. sensorName_sensorGroup_sensorStage_AnomalousOrNo).

In the illustrated example of FIG. 8, the anomaly determination engine 306 concatenates to generate the illustrated strings. For example, the anomaly determination engine 306 takes the sensor readings of the three sensors at a first time (or time period) are concatenates the first string illustrated in FIG. 8 to that sensor data (i.e. that first set of sensor readings), then takes the sensor readings of the three sensors at a second time (or time period) and concatenates the second string illustrated in FIG. 8 to that sensor data (i.e. that second set of sensor readings), and so forth.

The anomaly determination engine 306 then uses the generated asset state space to identify rare asset states, which are marked as asset anomalies, which differ from sensor anomalies. Since the asset state space is represented as a string at each time step/period, rare states are identified as rarely occurring string patterns in all available data by the anomaly determination engine 306. In one embodiment, the anomaly determination engine 306 examines a count of each state space string (state space at any given time), a median value, and all states that occur less than median −X*inter_quartile_range are marked as rare. In some embodiments, the "X" value is user defined. In some embodiments, the "X" value is between 1.5 and 3.

In some embodiments, the anomaly determination engine 306 groups assets into behavioral groups. For example, based on their asset states, the anomaly determination engine 306 assets into multiple groups based on their behavior at the asset-level. By using the normal/common and rare states identified by the anomaly determination engine 306. In one embodiment, the anomaly determination engine 306 generates the asset groups similar to how the pre-processing engine 302 generates sensor groups. For example, the anomaly determination engine 306 determines the asset groups by calculating different distance measures between the candidate assets and minimizing it. For example, the anomaly determination engine 306 calculates the correlation and covariance between all combinations of candidate assets (such as asset 1 & 2, 1 & 3, 1 & 4, 2 & 3 and so on), and determines that those assets which have a strong correlation and covariance with each other (e.g. satisfies a predetermined threshold) are grouped together. For example, if there are 5 assets, group 1 could be assets 1, 2, and 3 and group 2 could be assets 4 and 5. In one embodiment, the pre-processing engine 302 uses a Pearson or Spearman Coefficient for continuous sensor data, and a phi or chi-squared coefficient for categorical sensor data.

The prediction training engine 308 includes code and routines for prediction training. After the data describing behavior of the asset is determined by the platform, the system 100 may uses that information to predict the asset's behavior in the future. In one embodiment, the prediction training engine 308 divides the data, creates base models, which are intermediary models, the prediction training engine 308 used to generate final models. In one embodiment, the base models capture the characteristics of assets within a common behavioral group and subsequently serve as an input for the final models of each asset.

In one embodiment, the prediction training engine 308 samples data from each asset within a behavioral group. For example, the prediction training engine 308 takes a temporally ordered sample of 10% of the data from each asset that belong to a particular asset group. For each asset, the remaining data (e.g. 90% in the preceding example) is split into training and validation data sets. For example, the prediction training engine 308 splits the remaining data so that 70% is used for training and 30% is used for validation. In one embodiment, the prediction training engine 308 further splits the training date into multiple sub-sets for training on scale.

In one embodiment, the prediction training engine 308 creates a set of base models. A base model is a model that contains characteristics from each of the assets within a common behavioral group (e.g. those determined by the anomaly determination engine 306 as described above). It should be recognized that assets within a common behavioral group are not necessarily identical in behavior. In one embodiment, the prediction training engine 308 samples the data from each asset within an asset behavioral group (e.g. a temporally ordered 10% of the data from each asset within the behavioral group) and generates the base model for the group of assets.

In one embodiment, the base model is not a single model, but a set of models. For example, in one embodiment, the prediction training engine 308 uses the sampled data (e.g. 10% of the data) to generate three (3) models for each asset group. In one embodiment, the three (3) a model created for (1) anomalies identified at the asset level by the anomaly determination engine 306, (2) a model created from event data (e.g. when machine was offline, etc.) provided by the customer, if any, and (3) a model for a known event which the algorithm figured out from the anomalies that the system detected (e.g. more anomalies occur Monday morning or Friday afternoon, or a categorical data type reading "high" with greater frequency leads to an anomaly, etc.). In one embodiment, the prediction training engine 308 generates the set of base models for each sensor group within the asset group. For example, assume there are 5 sensor groups in an asset behavioral group; in one embodiment, the prediction training engine 308 generates three (3) models each sensor group, 15 models (e.g. 15 random forests) in total.

It should be recognized that by generating a base model, the system 100 transfers learning across assets in the behavioral group. Therefore, even if a particular asset does not have a lot of data, it can leverage the other assets in the group, which may issues surrounding a "cold-start" and improve the accuracy of predictions for that asset over predictions limited to only that asset's limited data.

After the initial, base models have been created for each asset group, the corresponding base model is given as an input to the asset prediction engine 310. The asset prediction engine 310 generates one or more final models. In one embodiment, the base model models the asset group and sensor groups therein, while a final model associated with a particular, individual asset. In one embodiment, the asset prediction engine 310 creates a final model for an asset based on the training data from the split performed by the prediction training engine 308, as described above In one embodiment, the final model is not a single model, but a set of models. For example, in one embodiment, the asset prediction engine 310 uses the training data (e.g. 70% of the 90% of the data not used to determine the base model) to generate three (3) models for each sensor group of that asset. In one embodiment, the three (3) a model created for (1) anomalies identified at the asset level by the anomaly determination engine 306, (2) a model created from event data (e.g. events provided by user identifying when machine was offline, etc.) provided by the customer, if any, and (3) a model for a known event which the algorithm figured out from the anomalies that the system detected (e.g. more anomalies occur Monday morning or Friday afternoon, or a categorical data type reading "high" with greater frequency leads to an anomaly, etc.).

After the initial, base models have been created for each asset group by the prediction training engine 308, a corresponding base model (or set) is given as an input to the asset prediction engine 310, which generates the final model for a particular asset (e.g. if an asset has 5 sensor groups, then 3 models are created for each sensor group, 15 models in total for that specific asset). The asset prediction engine 310 may repeat the process until a set of final models is generated for each individual asset.

In one embodiment, the prediction training engine 308 generates a final model using one or more of ensemble-ing, boosting, and recursion. For example, assuming the base model has twenty (20) trees, in one embodiment, the prediction training engine 308 boosts that set of recursively partitioned trees to generate an additional one hundred (100) trees (depending on the data). It should be noted that the base model and the final model belong to the same model family, and the final model builds on the base model. For example, if the base model is a logistic regression, the final model is a logistic regression; if the base model is a random forest, the final model is a random forest; if the base model is a neural network, the final model is a neural network, etc. It should be recognized that a logistic regression, a random forest, and a neural network are merely examples and that others exist, for example, XGBoost, gradient boosted trees, etc. The final model identifies pre-cursors of events so that the system 100, at run time, can notify users and appropriate preventative actions can be taken. In some embodiments, the output of the final model is probabilistic instead of binary, so a user gets an idea of the probability of the event when that is presented to the user.

In one embodiment, the anomaly detection engine 124 determines whether an asset anomaly, or type of asset anomaly, occurs extremely rarely (e.g. as defined by a threshold set by a user or the system 100). In some such embodiments, the anomaly detection engine 124 uses a Bayesian approach to create a model for conditional probability of an event given a subsequence, rather than generating the base model and final models as described above.

The asset prediction engine 310 includes code and routines for validating the final models. In one embodiment, the asset prediction engine 310 scores the validation data, which was determined by the split performed by the prediction training engine 308. In one embodiment, the prediction training engine 308 generates a classification report: accuracy, recall, precision, and F1 score against the final models that were created. Using the score of each sensor group, the system determines whether that sensor group is anomalous. In one embodiment, when at least one sensor group is anomalous, then there is considered to be an asset anomaly (anomalies determined for an asset based on sensor group prediction). The asset prediction engine 310 may also identify anomalous asset events (extreme), or non-events (still an anomaly but not considered as major as an asset event).

To this point, the anomaly detection engine 124 has been described with regard to historic data, once the final models are generated and validated, the anomaly detection engine may enter run time. At run time, sensor data is received and the asset prediction engine 310 includes code and routines for asset prediction based on the final models. In some embodiments, the output of the is probabilistic instead of binary, so a user gets an idea of the probability of the event when that is presented to the user.

In one embodiment, the anomaly detection engine 124 the newly received data and applies incremental learning to modify the final models, which may beneficially improve the model as the behavior of the asset may change over time and the model may improve as more data for the asset is acquired, particularly if the final model was generated when there was a small data set for that particular asset.

In one embodiment, the asset prediction engine 310 makes one or more types of predictions. As described above, in one embodiment, the final model includes three (3) types of models, i.e., a model for (1) anomalies identified at the asset level by the anomaly determination engine 306, sometimes referred to as "asset anomaly," (2) a model created from event data (e.g. events provided by user identifying when machine was offline, etc., occasionally referred to a "asset events") provided by the customer, if any, and (3) a model for a known event which the algorithm figured out from the anomalies that the system detected (e.g. "non-events, such as that more anomalies occur Monday morning or Friday afternoon, or a categorical data type reading "high" with greater frequency leads to an anomaly, such as going offline, etc.). Therefore, in one embodiment, the asset prediction engine 310 predicts one or more of an asset anomaly, an asset event, and a non-event.

In one embodiment, the anomaly detection engine 124 uses a history window, and makes predictions for a forecast window looking ahead by a period of gap window. For example, if the current time is 4:00 PM, the anomaly detection engine 124, or a user, might choose to look at the past 10 hours' worth of data (history window=10 hours), and make predictions about an event happening in any one hour window (forecast window=1 hour) 5 hours ahead (gap window=5 hours).

At this point, the asset prediction engine 310 has determined which assets are anomalous during specific time frames. In one embodiment, the insights engine 312 then determines during what time frame(s) there were sporadic events (with respect to other time frames) and pinpoints which sensors (instead of sensor groups, according to one embodiment) are at risk during these time frames. This helps the user learn more specifics of the asset's behavior. In one embodiment, the insight engine 312 does this using one or more of pattern mining and rule mining.

The insights engine 312 includes code and routines for one or more of pattern mining, rule mining, and insight consolidation. Pattern Mining identifies signals within sensor data that can lead up to a particular event of interest. In one embodiment, the insights engine 312 first determines whether the data is discrete or continuous. If the data is continuous, the insights engine 312 discretizes the data. Once the data is discretized or if the data was discrete, the insights engine 312 analyzes the discrete sensor data for repeating patterns throughout the data. In one embodiment, the insights engine 312 analyzes the discrete sensor data using one or more of association rule mining, prefix scan, and distribution-based rare pattern detection. While searching for repeating patterns, in some embodiments, the insights engine 312 specifically identifies unique sequences of data. The insights engine 312, using these unique patterns, pinpoints signals that lead up to a particular event of interest (e.g. a particular fault condition).

Rule mining identifies the characteristics that lead up to a specific event that occurred in the past. In one embodiment, the insights engine 312 identifies patterns in sensors that are associated with events provided by the customer. For example, the insights engine 312 uses the pattern mining algorithm prefix scan, which calculates the frequency of subsequences to help identify common and rare subsequences, and generates a rule using only those sensors identified as significant predictors of a customer provided event. For example, the insights engine 312 identifies that a user provided event (e.g. bad alternator) occurs after certain characteristics captured in sensor data (e.g. downward trend in battery charge, voltage, or cold-start amps) occur, and identifies a rule accordingly.

A distinction between rule mining and pattern mining is that rule mining addresses what happens leading up to events that were given as an input by a user (e.g. via event data). As a result of this, the system identifies certain characteristics that lead up to a specific, user-provided event that occurred in the past. By contrast, pattern mining uses system identified anomalies and identifies patterns leading up to those events.

In one embodiment, the insights engine 312 presents one or more storylines that it generates automatically using the outputs from the anomaly detection and prediction steps. In one embodiment, the storylines are generated to help users perform root-cause analyses and detect shifts in asset behavior over time.

Figure 9:
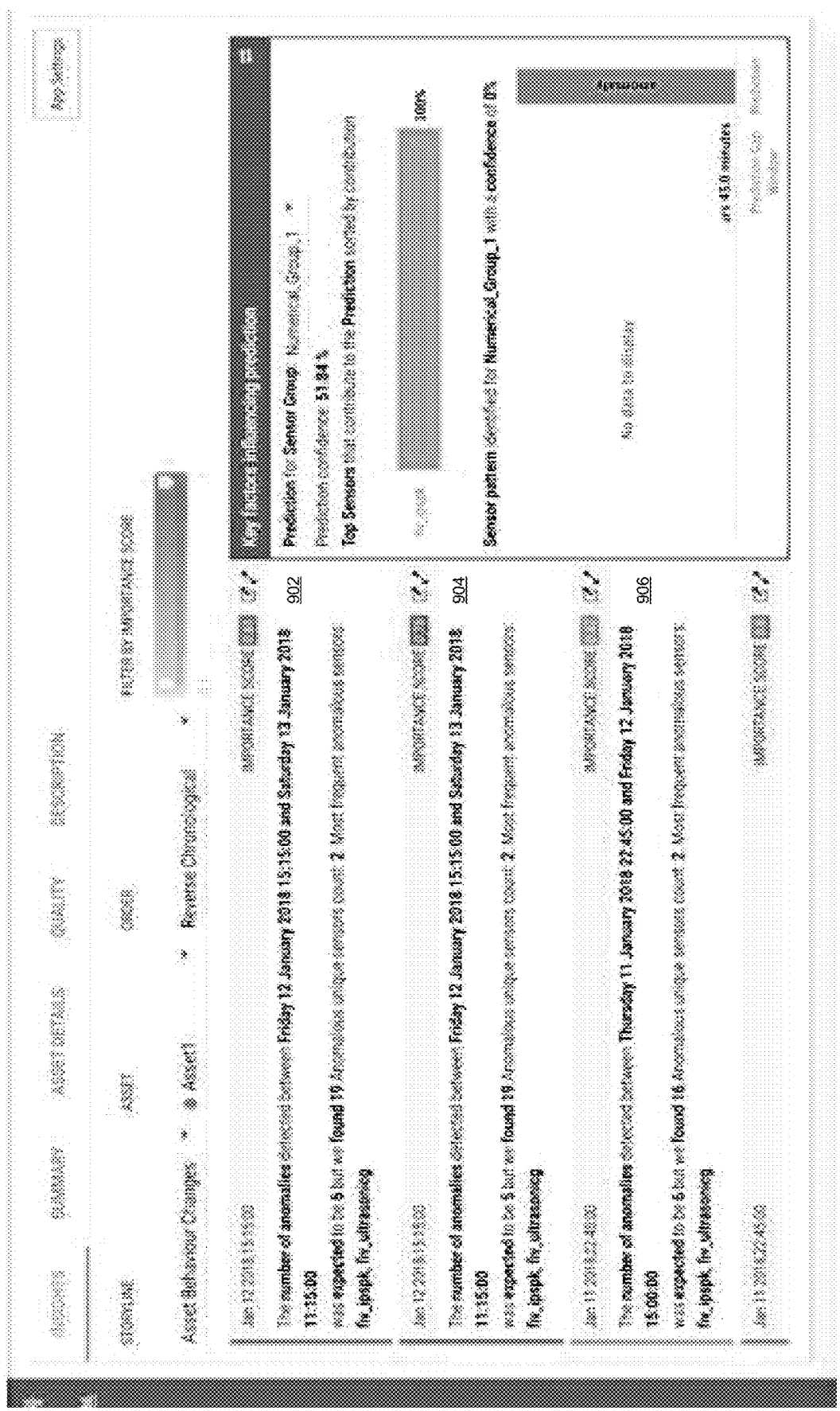
FIG. 9 is an example user interface according to one embodiment.

In one embodiment, the insights engine 312 filters repetitive insights and only present the unique insights to the user. These storylines are generated to help users perform root-cause analyses and detect shifts in asset behavior over time. In one embodiment, when all of the insights have been generated, the platform takes consecutive insights that are related and consolidates them into one statement, for example, statements 902, 904, and 906 in FIG. 9.

In one embodiment, the insights engine 312 scores and ranks the statements based on one or more criteria. Examples of criteria include, but are not limited to, the number of anomalies, a seriousness of an anomaly, a confidence level of the one or more anomalies, a frequency of the anomalies, a degree of deviation from the number of expected anomalies, recentness of the anomalies, etc.).

Example Methods

Figure 10:
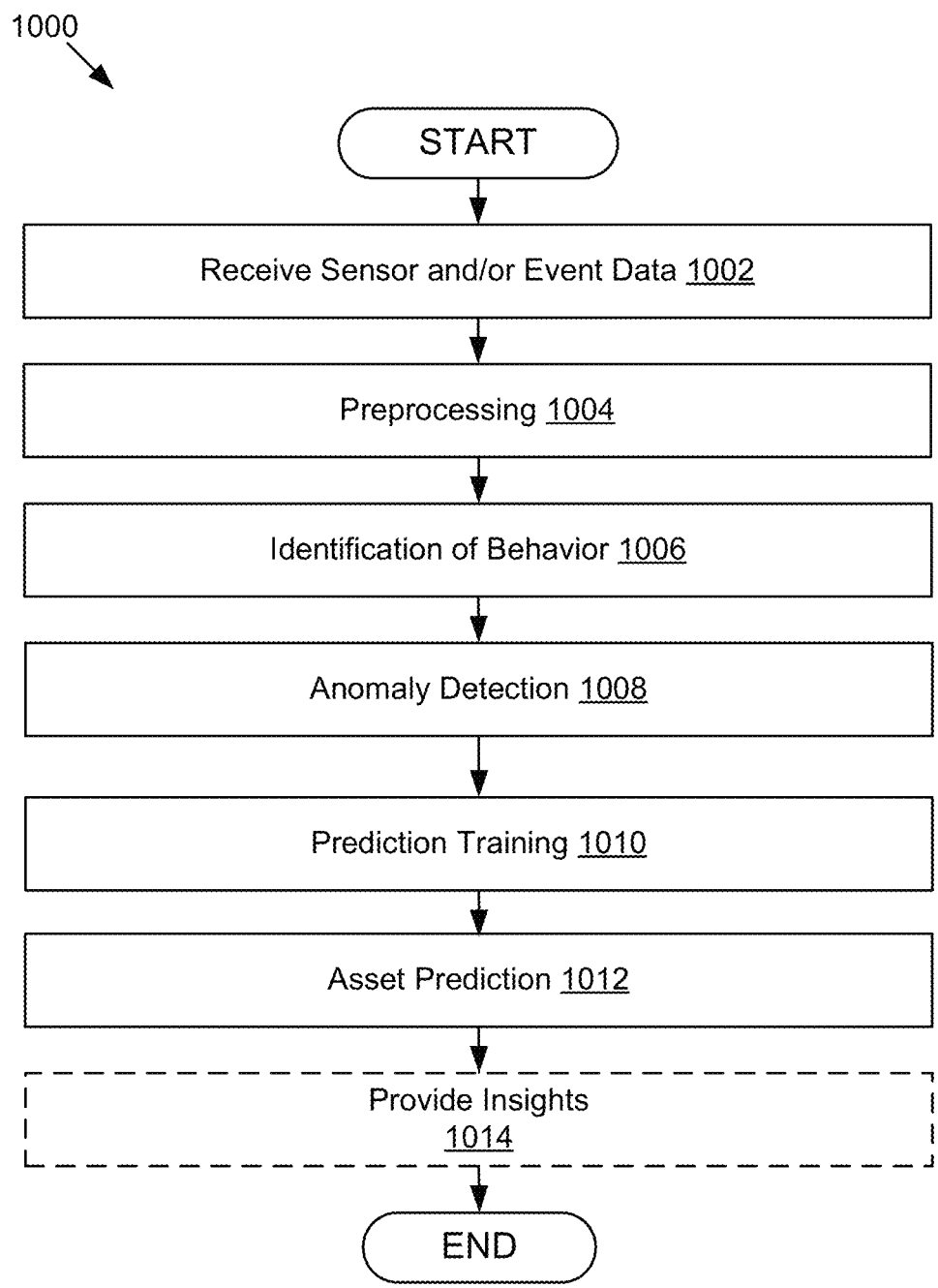
FIG. 10 is a flowchart of an example method for anomaly detection according to one embodiment.

FIGS. 10-13 are flowcharts illustrating an example methods that may be performed by the systems described in FIGS. 1-9. Referring to FIG. 10, an example method 1000 for anomaly detection according to one embodiment is shown. At block 1002, the pre-processing engine 302 receives sensor and/or event data. At block 1004, the pre-processing engine 302 performs preprocessing. At block 1006, the behavior ID engine 304 identifies behavior. A block 1008, the anomaly determination engine 306 detects anomalous behavior(s). At block 1010, the prediction training engine 308 performs prediction training. At block 1012, the asset prediction engine 310 performs asset prediction. At block 1014, the insights engine 312 presents insights to a user.

Figure 11:
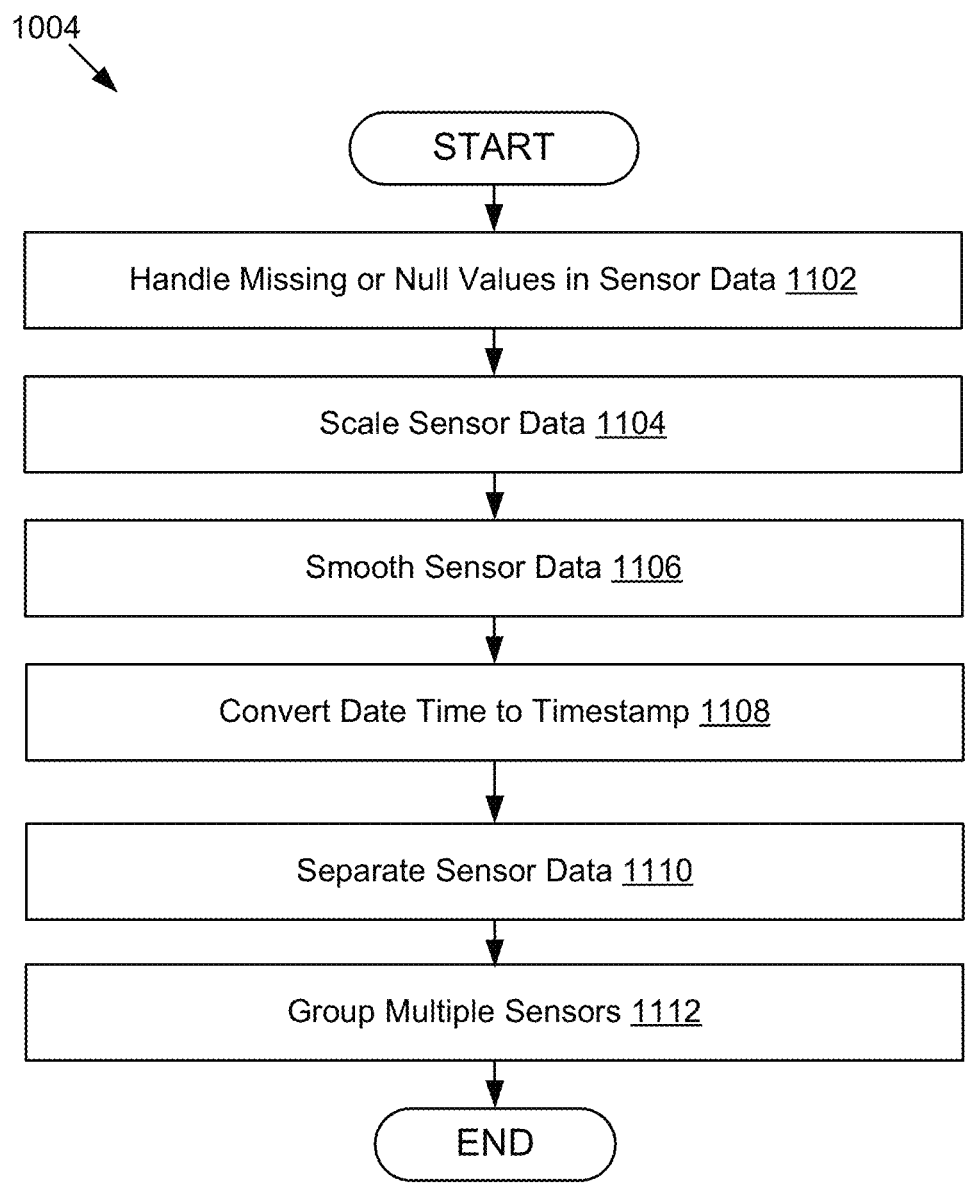
FIG. 11 is a flowchart of an example method for pre-processing according to one embodiment.

Referring to FIG. 11, an example method 1004 of pre-processing sensor data is shown according to one embodiment. At block 1102, the pre-processing engine 302 handles missing or null values in the sensor date (e.g. received at block 1002). At block 1104, the pre-processing engine 302 scales the received sensor data. At block 1106, the pre-processing engine 302 smooths the sensor data. A block 1108, the pre-processing engine 302 converts date time to timestamp. At block 1110, the pre-processing engine 302 separates sensor data. At block 1112, the pre-processing engine 302 groups multiple sensors into a group.

Figure 12:
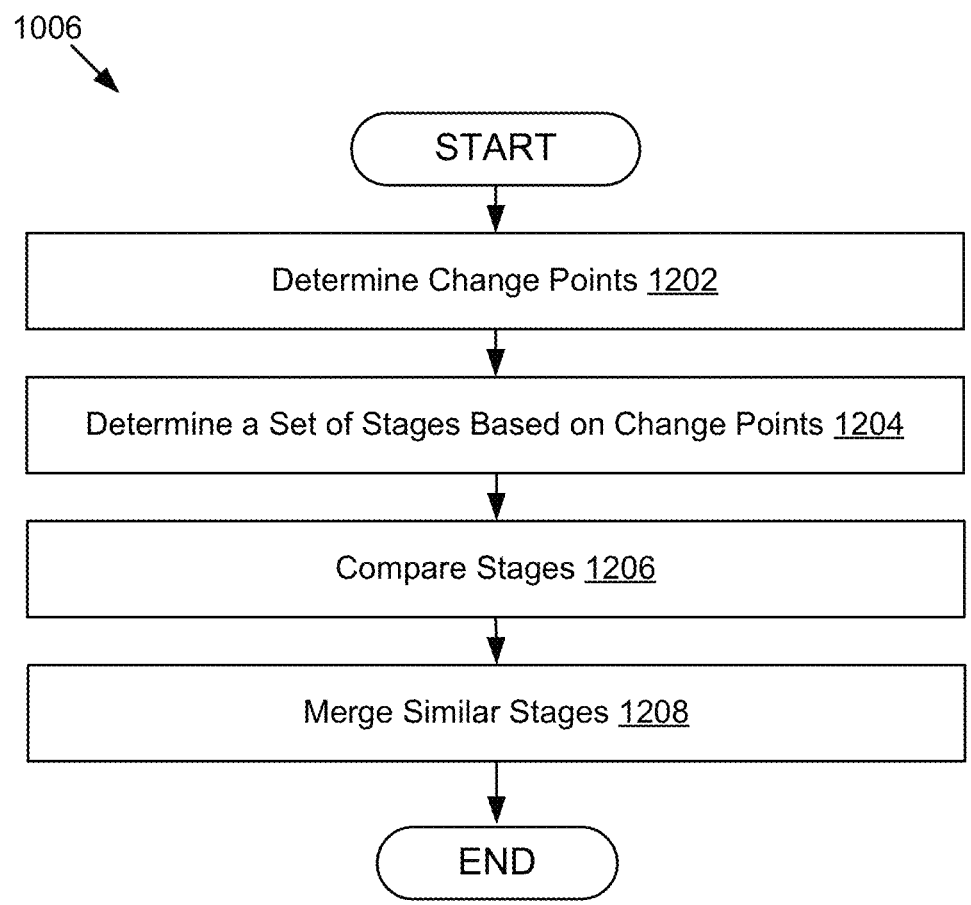
FIG. 12 is a flowchart of an example method for identification of behavior according to one embodiment.

Referring to FIG. 12, an example method 1006 for identification of behavior is shown according to one embodiment. At block 1202, the behavior ID engine 304 determines change points in the sensor data. At block 1204, the behavior ID engine 304 determines a set of stages based on the change points determined at block 1202. At block 1206, the behavior ID engine 304 compares the stages. A block 1208, the behavior ID engine 304 merges stages found to be similar in the comparison of block 1206.

Figure 13:
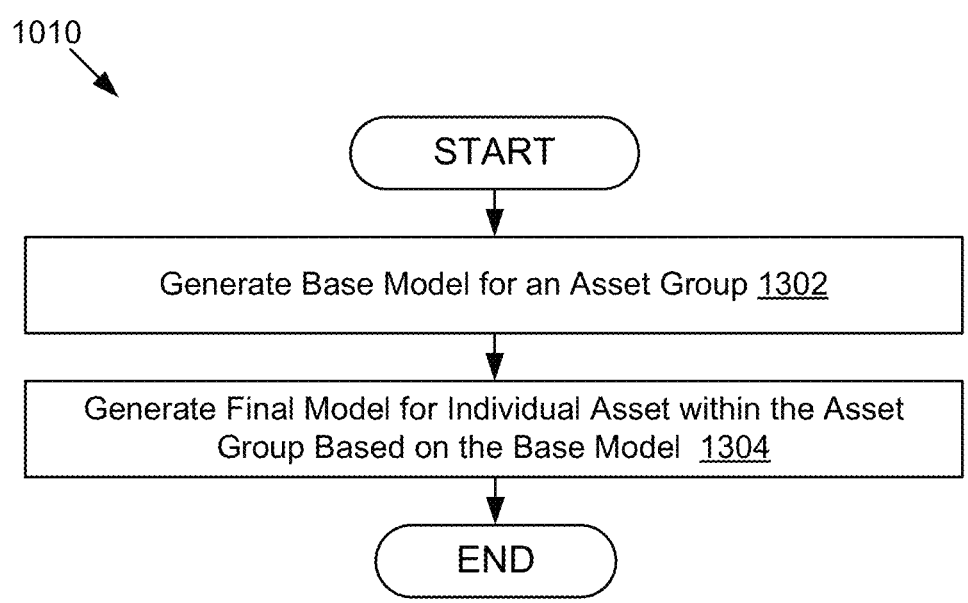
FIG. 13 is a flowchart of an example method for prediction training according to one embodiment.

Referring to FIG. 13, an example method 1010 for prediction training is shown according to one embodiment. At block 1302, the prediction training engine 308 generates a base model for an asset group. At block 1304, the prediction training engine 308 generates a final model for an individual asset within the asset group based on the base model generated at block 1302.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, engines, routines, features, attributes, methodologies and other aspects are not mandatory or significant, and the mechanisms that implement the specification or its features may have different names, divisions and/or formats.

Furthermore, the modules, engines, routines, features, attributes, methodologies and other aspects of the disclosure can be implemented as software, hardware, firmware, or any combination of the foregoing. Also, wherever a component, an example of which is an engine, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
receiving, using one or more processors, first sensor data from a first sensor, the first sensor associated with a first asset;

smoothing, using the one or more processors, the first sensor data;
determining, using the one or more processors, a first set of change points within the first sensor data;
dividing, using the one or more processors, based on the first set of change points, the first sensor data into a first stage of the first sensor data and a second stage of the first sensor data;
determining, using the one or more processors, a first probability density distribution of the first stage of the first sensor data;
determining, using the one or more processors, a second probability density distribution of the second stage of the first sensor data;
determining, using the one or more processors, that the first probability density distribution and the second probability density distribution are statistically similar;
responsive to determining that the first probability density distribution and the second probability density distribution are statistically similar, merging, using the one or more processors, the second stage of the first sensor data into the first stage of the first sensor data;
determining, using the one or more processors, a first set of anomalies within the first stage;
generating, using the one or more processors, a first asset state space associated with the first asset;
training, using the one or more processors, a base model describing a first group of one or more assets, the first group of one or more assets including the first asset; and
training, using the one or more processors and the base model, a final model particular to the first asset.

2. The method of claim 1 comprising:
receiving second sensor data from a second sensor;
smoothing the second sensor data;
calculating a correlation and a covariance between the first sensor and the second sensor based on the smoothed first sensor data and smoothed second sensor data; and
grouping the first sensor and the second sensor into a first sensor group based on the correlation and the covariance,
wherein the sensor data is the sensor data associated with the first sensor group, the first sensor group including the first sensor and the second sensor.

3. The method of claim 1, wherein determining the first set of anomalies within the first stage of the sensor data uses one or more of a magnitude-based algorithm, a sequence-based algorithm, and a frequency-based algorithm.

4. The method of claim 1, comprising:
determining a first set of rare asset states in the first asset state space;
determining a second set of rare asset states in a second asset state space, the second asset state space associated with a second asset;
determining a correlation and a covariance between the first asset and the second asset; and
based on the correlation and covariance, grouping the first asset and the second asset into the first group of one or more assets.

5. The method of claim 1, wherein the base model describing the first group of one or more assets includes one or more of:
a first base model created for anomalies identified at an asset level;
a second base model created from event data received from a user, when the event data has been received from the user; and
a model created for a system-identified, known event.

6. The method of claim 1, wherein the final model is an ensemble.

7. The method of claim 1 comprising:
receiving new sensor data from the first sensor;
applying the final model to the new sensor data; and
presenting a probabilistic prediction of an anomaly to a user based on the application of the final model to the new sensor data.

8. The method of claim 1 comprising:
analyzing the first sensor data, which is discrete data, for repeating patterns leading up to an anomaly.

9. The method of claim 8, wherein analyzing the first sensor data includes one or more of a prefix scan, association rule making, and distribution-based pattern detection.

10. A system comprising:
one or more processors; and
a memory storing instructions that, when executed by the one or more processors, cause the system to:
receive first sensor data from a first sensor, the first sensor associated with a first asset;
smooth the first sensor data;
determine a first set of change points within the first sensor data;
divide, based on the first set of change points, the first sensor data into a first stage of the first sensor data and a second stage of the first sensor data;
determine a first probability density distribution of the first stage of the first sensor data;
determine a second probability density distribution of the second stage of the first sensor data;
determine that the first probability density distribution and the second probability density distribution are statistically similar;
responsive to determining that the first probability density distribution and the second probability density distribution are statistically similar, merge the second stage of the first sensor data into the first stage of the first sensor data;
determine a first set of anomalies within the first stage;
generate a first asset state space associated with the first asset;
train a base model describing a first group of one or more assets, the first group of one or more assets including the first asset; and
train, using the base model, a final model particular to the first asset.

11. The system of claim 10, the memory comprising instructions that, when executed by the one or more processors, cause the system to:
receive second sensor data from a second sensor;
smooth the second sensor data;
calculate a correlation and a covariance between the first sensor and the second sensor based on the smoothed first sensor data and smoothed second sensor data; and
group the first sensor and the second sensor into a first sensor group based on the correlation and the covariance,
wherein the sensor data is the sensor data associated with the first sensor group, the first sensor group including the first sensor and the second sensor.

12. The system of claim 10, wherein determining the first set of anomalies within the first stage of the sensor data uses one or more of a magnitude-based algorithm, a sequence-based algorithm, and a frequency-based algorithm.

13. The system of claim 10, the memory comprising instructions that, when executed by the one or more processors, cause the system to:
   determine a first set of rare asset states in the first asset state space;
   determine a second set of rare asset states in a second asset state space, the second asset state space associated with a second asset;
   determine a correlation and a covariance between the first asset and the second asset; and
   based on the correlation and covariance, group the first asset and the second asset into the first group of one or more assets.

14. The system of claim 10, wherein the base model describing the first group of one or more assets includes one or more of:
   a first base model created for anomalies identified at an asset level;
   a second base model created from event data received from a user, when the event data has been received from the user; and
   a model created for a system-identified, known event.

15. The system of claim 10, wherein the final model is an ensemble.

16. The system of claim 10, the memory comprising instructions that, when executed by the one or more processors, cause the system to:
   receive new sensor data from the first sensor;
   apply the final model to the new sensor data; and
   present a probabilistic prediction of an anomaly to a user based on the application of the final model to the new sensor data.

17. The system of claim 10, the memory comprising instructions that, when executed by the one or more processors, cause the system to:
   analyze the first sensor data, which is discrete data, for repeating patterns leading up to an anomaly.

18. The system of claim 17, wherein analyzing the first sensor data includes one or more of a prefix scan, association rule making, and distribution-based pattern detection.

* * * * *